No. 646,170. Patented Mar. 27, 1900.
A. HAZELTON.
CHURN DASHER.
(Application filed Aug. 29, 1899.)
(No Model.)

Witnesses
F. E. Alden

Asa Hazelton, Inventor
By his Attorneys,
C. A. Snow & Co.

UNITED STATES PATENT OFFICE.

ASA HAZELTON, OF MIDDLETOWN, MISSOURI, ASSIGNOR OF ONE-HALF TO WILLIAM S. BOYD, OF VANDALIA, MISSOURI.

CHURN-DASHER.

SPECIFICATION forming part of Letters Patent No. 646,170, dated March 27, 1900.

Application filed August 29, 1899. Serial No. 728,898. (No model.)

*To all whom it may concern:*

Be it known that I, ASA HAZELTON, a citizen of the United States, residing at Middletown, in the county of Montgomery and State of Missouri, have invented a new and useful Churn-Dasher, of which the following is a specification.

This invention relates to rotary churn-dashers of that class embodying a receptacle for containing a tempering liquid, and is especially designed to improve the construction shown in my former patent, No. 595,627, dated December 14, 1897. In this patent it is necessary to remove the receptacle for containing the tempering liquid, so that the latter may be placed in the receptacle; and the essential object of the present invention is to obviate the constant removal of the receptacle and at the same time to permit of the ready introduction of the tempering liquid into the receptacle while the dasher is in motion.

A further object is to provide an improved arrangement of the dasher-blades in respect to the tempering-receptacle, so that an easy and effective operation of the dasher is had.

To these ends the present invention consists in the combination and arrangement of parts, as will be hereinafter more fully described, shown in the accompanying drawings, and particularly pointed out in the appended claim, it being understood that changes in the form, proportion, size, and the minor details of construction may be made within the scope of the appended claim without departing from the spirit or sacrificing any of the advantages of the present invention.

Figure 1:
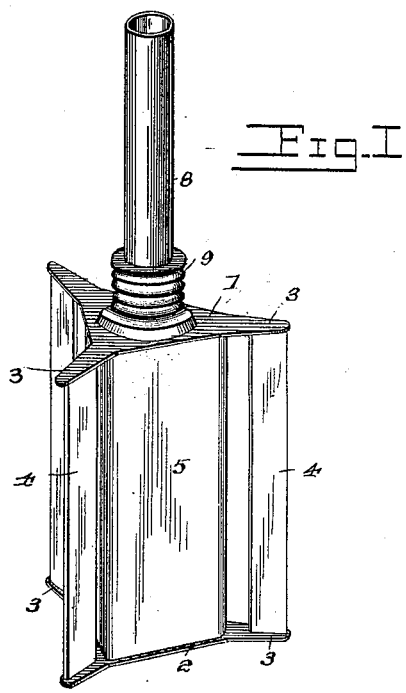
Figure 2:
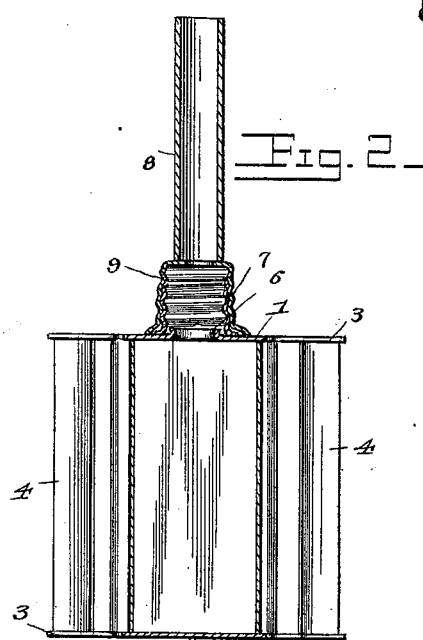
Figure 3:
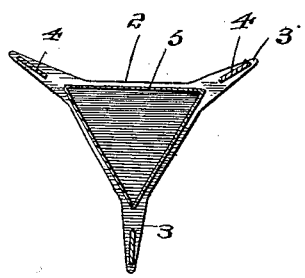

In the drawings, Figure 1 is a perspective view of a churn-dasher constructed in accordance with the present invention. Fig. 2 is a longitudinal sectional view thereof. Fig. 3 is a horizontal transverse sectional view of the improved dasher.

Corresponding parts in the several figures of the drawings are designated by like characters of reference.

Referring to the accompanying drawings, it will be seen that the present dasher comprises upper and lower heads 1 and 2, respectively, which are substantially triangular in shape and preferably equal in size. Radial arms 3 project outwardly from each corner of the triangular head, and the respective upper and lower arms are connected by vertical dasher-blades 4, which are disposed in the vertical planes of the adjacent arms 3. Intermediate of the dasher-blades is located the body or receptacle 5, which is designed to contain the tempering liquid. The cross-sectional shape of this receptacle is triangular, as best shown in Fig. 3 of the drawings, and is of substantially the same size as the triangular body portions of the upper and lower heads 1 and 2. The upper and lower ends of the receptacle are closed by the respective heads 1 and 2, and the angular corners thereof are arranged adjacent to the respective dasher-blades 4 and the latter are spaced a suitable distance from the adjacent corners of the receptacle, as clearly shown in Fig. 3.

Provided in the upper head 1 and centrally of the receptacle 5 is an opening 6, through which the tempering liquid is adapted to be introduced into the interior of the receptacle. Surrounding this opening and projecting upwardly from the upper head 1 is a threaded flange 7, to which the dasher-stem 8 is removably connected. The lower end of the dasher-stem is provided with a threaded coupling member, which is adapted to be fitted to the threaded flange 7 or other coupling member, so that the dasher-stem may be detachably connected to the dasher.

During the churning operation it is essential that the cream be maintained at a normal temperature, and therefore it is customary to add to the tempering liquid contained within the receptacle therefor. Heretofore it has been necessary to stop the churning operation and in some instances to remove parts of the dasher in order that additional tempering liquid may be introduced. Such stopping of the operation of the dasher has been found to retard the formation of butter and also to result in an inferior quality thereof. To obviate these difficulties, a filling-tube has been provided and is formed by the hollow dasher-stem 8, which is in communication with the interior of the receptacle 5, and the upper end of the stem opens axially outward, so as to form an inlet-opening, which is relatively fixed in the axis of rotation of the dasher, whereby the tempering liquid may be introduced through said inlet-opening while the dasher is in operation and without removing any of the parts thereof.

Projecting centrally from the lower head 2 is a pivot-pin $9^a$, which is adapted to engage a suitable socket provided in the bottom of the churn-body with which the present form of dasher may be employed.

It is preferable to form the heads, the tempering-receptacle, and the dasher-blades from tin or other suitable sheet metal, so as to provide a light and durable dasher, which may be readily cleansed, and thereby provide a sanitary device. Thus it will be seen that the angular shape of the body causes an agitation of the cream independently of the dasher-blades, and the combined action of the angular body and the dasher-blades produces an exceedingly-effective agitation of the cream. Furthermore, it will be seen that the hollow dasher-stem permits the tempering liquid to be readily introduced into the angular body and that it prevents such liquid from being accidentally discharged into the interior of the body of the churn.

What I claim is—

A device of the class described comprising a receptacle triangular in horizontal section and composed of side walls and upper and lower heads having radial arms extending outward from the angles of the receptacle, the upper head being provided with an opening and having a threaded annular flange surrounding the opening, the blades 4 mounted between the outer portions of the arms and spaced from the corners or angles of the receptacle, and a hollow dasher-stem provided at its lower end with a threaded flange detachably engaging the flange of the receptacle and forming a filling-tube, substantially as and for the purpose described.

In testimony that I claim the foregoing as my own I have hereto affixed my signature in the presence of two witnesses.

ASA HAZELTON.

Witnesses:
  J. J. COPE,
  H. C. SANKEY.